United States Patent Office 2,847,454
Patented Aug. 12, 1958

2,847,454

CARBAMATE OF A TETRACYCLIC ALCOHOL

Werner R. Boehme, Somerville, and Joseph Nichols, Princeton, N. J., assignors to Ethicon, Inc., a corporation of New Jersey No Drawing. Application March 26, 1956
Serial No. 573,586

1 Claim. (Cl. 260—482)

The present invention relates to 2-carbamyloxy-1,4,5,8-bisendomethylene-$\Delta^{6,7}$-octalin, which has especially advantageous utility as an anticonvulsant when employed in the treatment of epileptiform disorders. 2-carbamyloxy-1,4,5,8-bisendomethylene-$\Delta^{6,7}$-octalin is represented by the following planar structural formula:

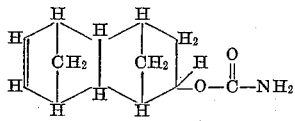

For the purpose of illustration, the following example is set forth to illustrate the preparation of 2-carbamyloxy-1,4,5,8-bisendomethylene-$\Delta^{6,7}$-octalin, but is not to be construed as limiting the spirit of the invention or its scope.

284 grams of monomeric vinyl acetate, 233 grams of dicyclopentadiene and five grams of hydroquinone were mixed and heated in an autoclave at 185–190° C. for ten hours, removed from the autoclave and distilled through a Vigreux column. 2-acetoxy-1,4,5,8-bisendomethylene-$\Delta^{6,7}$-octalin had a boiling point of 140–150° C. at 13 mm. pressure.

66.5 grams of 2-acetoxy-1,4,5,8-bisendomethylene-$\Delta^{6,7}$-octalin was refluxed for three hours with a solution of 60.5 grams of potassium hydroxide in 600 grams of methanol. Seventy-five cc. of water were added, most of the methanol was removed by distillation, and the residue was extracted with ether. The extracts were dried over anhydrous potassium carbonate and the solvent was evaporated. The residue was recrystallized from hexane and from water. The recrystallized 2-hydroxy-1,4,5,8-bisendomethylene-$\Delta^{6,7}$-octalin had a melting point of 111–112° C.

Calculated for $C_{12}H_{16}O$: Carbon=81.77%; hydrogen=9.15%. Found: Carbon=81.46%; hydrogen=9.28%.

A solution of 9.4 grams of 2-hydroxy-1,4,5,8-bisendomethylene-$\Delta^{6,7}$-octalin and 5.2 grams of urethane in 20 ml. of toluene was heated to the boiling point to remove all traces of water and then one-fourth gram of aluminum isopropoxide was added and the bath temperature was raised to 150–160° C. 12.4 grams of distillate were collected during the next ten hours. The hot reaction mixture was filtered and the precipitate which separated from the filtrate upon cooling was triturated with water. The residue was recrystallized from toluene and the recrystallized 2-carbamyloxy-1,4,5,8-bisendomethylene-$\Delta^{6,7}$-octalin had a melting point of 110–111° C.

Calculated for $C_{13}H_{17}NO_2$: Carbon=71.20%; hydrogen=7.82%; nitrogen=6.39%. Found: Carbon=71.39%; hydrogen=9.09%; nitrogen=6.54%.

2 - carbamyloxy - 1,4,5,8 - bisendomethylene - $\Delta^{6,7}$-octalin was tested for anticonvulsant activity by the method of Swinyard, Brown and Goodman, Journal of Pharmacology and Experimental Therapeutics, volume 106, page 319 (1952), for measuring its action against Metrazol-induced and electroshock-induced convulsions. The median effective dose of 2-carbamyloxy-1,4,5,8-bisendomethylene-$\Delta^{6,7}$-octalin which prevented, in fifty percent of the mice to which the substance was given orally, a tonic extensor component of the convulsion of the hind leg induced by a current strength of fifty milliamperes applied for a duration of two-tenths of a second was 250 milligrams per kilogram of body weight, and the median effective dose of 2-carbamyloxy-1,4,5,8-bisendomethylene-$\Delta^{6,7}$-octalin required to prevent the typical convulsive seizures induced by a standard subcutaneous dose of Metrazol in fifty percent of the mice to which the substance was given orally was 500 milligrams per kilogram of body weight. 2-carbamyloxy-1,4,5,8-bisendomethylene-$\Delta^{6,7}$-octalin is non-toxic.

While the invention has been illustrated by certain individual specific embodiments, it is understood that variations, substitutions and modifications may be made to the extent of the scope of the appended claim.

What is claimed is:

2 - carbamyloxy - 1,4,5,8 - bisendomethylene - $\Delta^{6,7}$-octalin.

No references cited.

UNITED STATES PATENT OFFICE
CERTIFICATE OF CORRECTION

Patent No. 2,847,454            August 12, 1958

Werner R. Boehme et al.

It is hereby certified that error appears in the printed specification of the above numbered patent requiring correction and that the said Letters Patent should read as corrected below.

Column 2, line 19, for "hydrogen=9.09%;" read -- hydrogen=8.09%; --.

Signed and sealed this 28th day of October 1958.

(SEAL)

Attest:

KARL H. AXLINE
Attesting Officer

ROBERT C. WATSON
Commissioner of Patents